(12) United States Patent
Sugimoto et al.

(10) Patent No.: US 6,524,759 B1
(45) Date of Patent: Feb. 25, 2003

(54) REVERSIBLE RECORDING MEDIUM, AND REVERSIBLE RECORDING METHOD AND APPARATUS USING THE SAME

(75) Inventors: Hiroyuki Sugimoto, Kanagawa (JP); Shigeaki Nimura, Chiba (JP); Kyohji Tsutsui, Shizuoka (JP); Nobuyuki Tamaoki, c/o Agency of Industrial Science and Technology, National Institute of Materials and Chemical Research, 1-1, Higashi, Tsukuba-shi, Ibaraki-ken 305-0046 (JP); Hiroo Matsuda, c/o Agency of Industrial Science and Technology, National Institute of Materials and Chemical Research, 1-1, Higashi, Tsukuba-shi, Ibaraki-ken 305-0046 (JP)

(73) Assignees: Agency of Industrial Science and Technology, Tsukuba (JP); Nobuyuki Tamaoki, Tsukuba (JP); Hiroo Matsuda, Tsukuba (JP); Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/513,083

(22) Filed: Feb. 25, 2000

(30) Foreign Application Priority Data

Feb. 25, 1999 (JP) ............................................. 11-049051

(51) Int. Cl.[7] ............................................... G02F 1/133
(52) U.S. Cl. .............................. 430/20; 430/19; 349/2; 349/22; 349/20; 349/86
(58) Field of Search .......................... 430/20, 19; 349/2, 349/22, 20, 86

(56) References Cited

U.S. PATENT DOCUMENTS

5,448,382 A * 9/1995 Land et al. .................... 359/43
5,805,245 A * 9/1998 Davis ........................... 349/20
6,197,460 B1 * 3/2001 Tamaoki et al. ............... 430/20

FOREIGN PATENT DOCUMENTS

| DE | 19820106 | * | 11/1998 |
| JP | 02-004245 | * | 1/1990 |
| JP | 07-068935 | * | 3/1995 |

OTHER PUBLICATIONS

Marcelis et al. "Thermal and Optical Properties of Chiral Twin Liquid Crystalline bis(cholesteryl) alkandioates", J. Mater. Chem., vol. 6(9), pp. 1469–1472.*

* cited by examiner

Primary Examiner—Martin Angebrannt
(74) Attorney, Agent, or Firm—Oblon, Spivak, McClelland, Maier & Neustadt, P.C.

(57) ABSTRACT

A reversible recording medium has a support, a reversible light absorbing layer formed on the support, and, a reversible cholesteric reflection layer formed on the reversible light absorbing layer, containing a cholesteric liquid crystalline compound capable of assuming a cholesteric liquid crystalline phase reversibly showing iridescent colors by selective reflection. A method for reversibly recording an image in the above-mentioned recording medium, and a reversible recording apparatus using the above-mentioned recording medium are also disclosed.

63 Claims, 3 Drawing Sheets

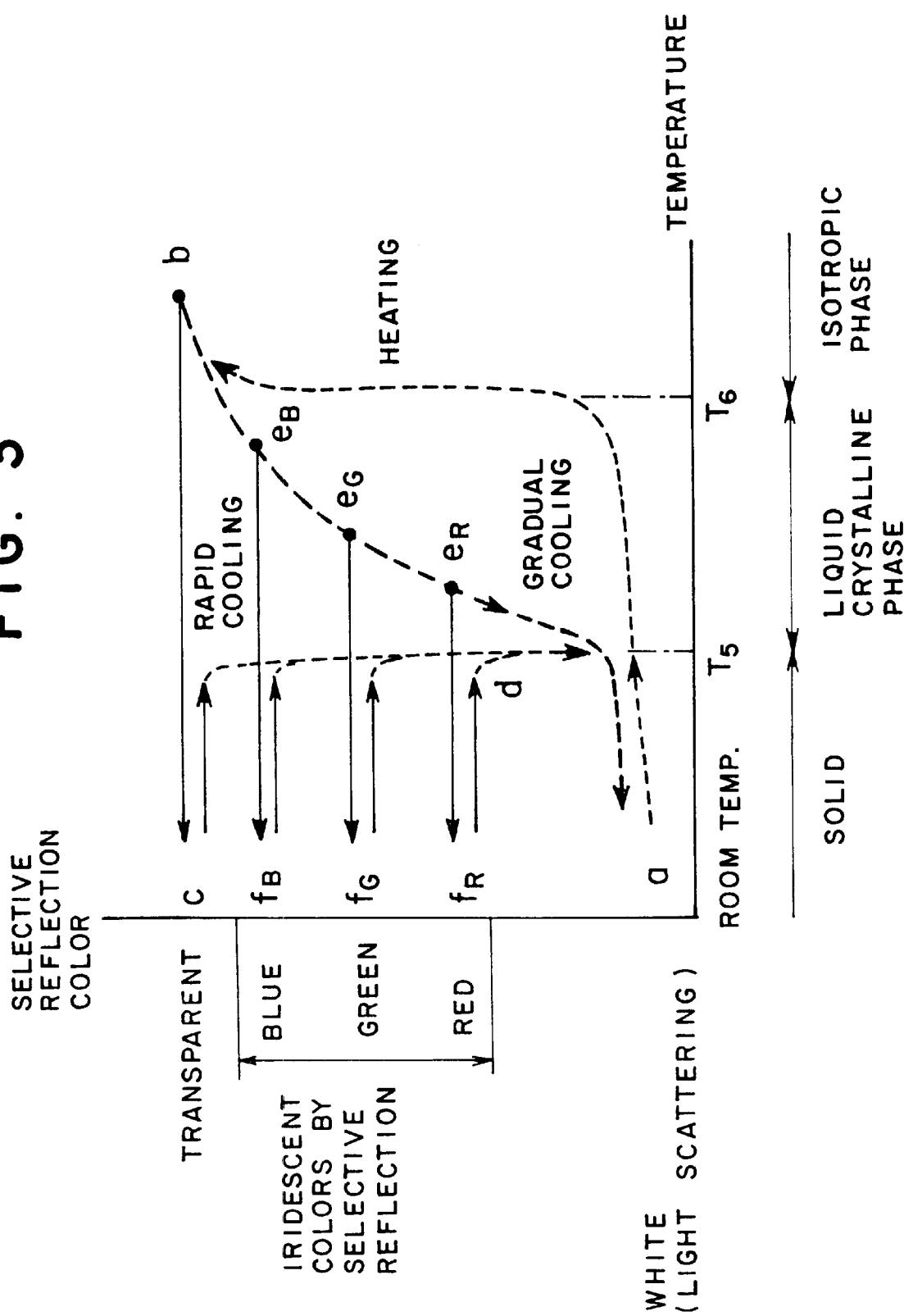

REVERSIBLE RECORDING MEDIUM, AND REVERSIBLE RECORDING METHOD AND APPARATUS USING THE SAME

BACKGROUND OF THE INVENTION

1. Field of the Invention

The present invention relates to a reversible recording medium comprising a cholesteric liquid crystalline material, and a reversible recording method and apparatus using the above-mentioned reversible recording medium. In particular, the present invention relates to a reversible recording medium capable of forming multi-color images with high contrast, and in addition, forming images on a paper-like background with high degree of whiteness. The above-mentioned recording medium is suitable for a rewritable full-color recording medium and multi-valued recording medium.

2. Discussion of Background

Prior arts relating to the present invention are as follows:
1. Japanese Laid-Open Patent Application 6-92016

A temperature sensitive ink composition comprising a leuco dye, a color developer, and a desensitizer is coated on a support, and a liquid crystal capable of inducing light interference is superimposed on the ink composition, whereby a recording medium is prepared. The principle of image recording in the above-mentioned recording medium is that the operation of color development and decolorization of the leuco dye is utilized in combination with the coherent iridescent colors produced by the liquid crystal. The drawback of this recording medium is the absence of memory characteristics.

2. Japanese Laid-Open Patent Application 6-313880

A rewritable display medium is prepared by successively providing a microcapsule layer, each microcapsule containing a liquid and magnetic particles in the form of flakes dispersed therein, and a polymeric liquid crystalline compound layer capable of showing selective reflection on a support in this order. Iridescent colors obtained by selective reflection can be reversibly displayed, but multi-color display cannot be carried out.

3. Japanese Laid-Open Patent Application 6-273707

A recording layer comprises a polymeric cholesteric liquid crystal. The liquid crystal assumes a cholesteric liquid crystalline phase when heated at a predetermined temperature. The subsequent rapid cooling of the above-mentioned cholesteric liquid crystal to a glass transition temperature (Tg) or less makes it possible to fix the reflected color of the cholesteric liquid crystal at room temperature. Thus, a color image can be recorded in the recording layer comprising the cholesteric liquid crystal. Thereafter, by heating the recording layer at an isotropic phase transition temperature or more, the recording layer is made transparent. The transparent state of the recording layer can be fixed at room temperature by rapid cooling, thereby erasing the recorded image. The reversible recording is thus carried out.

4. N. Tamoki, A. V. Parfenov, A. Masaki, H. Matsuda, Adv. Mater. 1997, 9, 1 102–1104

Dicholesteryl 10,12-docosadiynedioate shows a cholesteric phase between 87 and 115° C. When the above-mentioned compound in a cholesteric phase is rapidly cooled to 0° C., the compound becomes solid fixedly showing iridescent colors. The fixed iridescent colors continuously vary within the range from blue to red depending on the temperature at which the rapid cooling starts. The fixed iridescent colors are stable for six months or more at room temperature. The iridescent colors disappear by heating the compound at 119° C. or more. In addition, one iridescent color first obtained can be erased by heating the compound above 119° C., and the other iridescent color can be fixed by rapidly cooling the compound from the temperature where the compound can assume a cholesteric phase with the second iridescent color. This type of recording material can achieve rewritable full-color recording.

5. "High Polymers, Japan" vol. 47, October, 760

There is proposed a recording medium comprising a cholesteric liquid crystalline compound having a molecular weight of 2000 or less and a glass transition temperature of 35° C. or more, or a material comprising the above-mentioned liquid crystalline compound. When the liquid crystalline compound in a cholesteric liquid crystalline phase is rapidly cooled, an iridescent color characteristic of the cholesteric liquid crystalline phase can be maintained at room temperature for a long period of time. When the compound is returned into the cholesteric liquid crystalline phase by heating the compound again, image recording can be repeatedly carried out.

The above-mentioned conventional recording materials 3 and 4 have useful features for rewritable full-color recording media and multi-valued recording media. However, those recording materials have the problem of poor image contrast because the image is recognized by selective reflection.

For instance, in conventional recording media of a transmission type, there is a limit to a decrease of the transmittance of the recording media even when the recording media can be made white opaque by crystallization. Therefore, complete light screening cannot be attained when transmitted light is used. There is a demand for improvement of black color display, for example, when the recording media are used with an overhead projector (OHP).

In recording media of a reflection type using the above-mentioned conventional recording materials, it is necessary to dispose a black layer capable of absorbing extra light behind the recording layer. There is a risk of white color display obtained by making the recording media white opaque being hindered by the black layer.

As mentioned above, the conventional recording materials comprising the cholesteric liquid crystalline compounds have the drawbacks that the background portion is not quite as white as that of a sheet of paper, and that images cannot be displayed with high contrast.

6. Japanese Laid-Open Patent Application 6-79970

There is proposed a reversible thermosensitive multi-color recording medium or display medium capable of repeating the formation and erasure of multi-color images by using a coloring agent such as a leuco dye and a color developer in combination.

In such a recording medium, a recording layer (or image formation layer) comprising the coloring agent and the color developer is provided on a support. When the recording layer is heated imagewise at a color development temperature to fuse the composition of the coloring agent and the color developer, color development takes place in the recording layer, thereby obtaining a color-developed image therein. The image thus obtained is erased when the recording layer is heated at a temperature lower than the color development temperature. Further, the recording layer (or the image formation layer) is characterized by comprising a plurality of layers of a plurality of kinds of microcapsules, capable of producing different color tones and showing different decolorization initiating temperatures.

In the above-mentioned reversible recording medium employing a plurality of dyes, each dye assumes a color-developed state and a decolorized state. Therefore, it is supposed that color images be formed on a white background just like color hard copy when a white support is employed. However, for obtaining a full-color image, it is required to select three kinds of materials capable of producing primary colors, that is, magenta, yellow, and cyan, in view of the matching performance of their color development characteristics and decolorization characteristics. It is difficult to realize the optimal selection.

Further, in Japanese Laid-Open Patent Application 6-79970, it is necessary that the color development characteristics and decolorization characteristics of the materials be controlled in order to obtain multi-color images. It is very difficult to solve this problem. There is an increasing demand for a recording medium capable of recording and displaying multi-color images, of which the materials can be easily chosen so as to obtain satisfactory matching properties.

SUMMARY OF THE INVENTION

Accordingly, it is a first object of the present invention to provide a reversible recording medium comprising a cholesteric liquid crystalline compound, capable of displaying multi-color images, in particular, displaying a black color and a white color, which are considered to be difficult when selective reflection is utilized, and capable of recording images with high contrast, by using materials having well-matched characteristics which can be easily chosen.

A second object of the present invention is to provide a reversible recording medium capable of displaying multi-color images, using the above-mentioned recording medium.

A third object of the present invention is to provide an apparatus for reversibly recording and displaying multi-color images, using the above-mentioned recording medium.

The above-mentioned first object of the present invention can be achieved by a reversible recording medium comprising a support, a reversible light absorbing layer formed on the support, and a reversible cholesteric reflection layer formed on the reversible light absorbing layer, comprising a cholesteric liquid crystalline compound capable of assuming a cholesteric liquid crystalline phase reversibly showing iridescent colors by selective reflection.

The second object of the present invention can be achieved by a method for reversibly recording an image in the above-mentioned reversible recording medium, comprising the steps of applying a thermal energy imagewise to the reversible recording medium to simultaneously form an image in the reversible cholesteric reflection layer and an image in the reversible light absorbing layer in a superimposed configuration, and recording the image formed in the reversible cholesteric reflection layer or the image formed in the reversible light absorbing layer by controlling the conditions of cooling and heating the recording medium.

The third object of the prevent invention can be achieved by a reversible recording apparatus using the above-mentioned reversible recording medium, comprising means for imagewise applying a thermal energy to the reversible recording medium to simultaneously form an image in the reversible cholesteric reflection layer and an image in the reversible light absorbing layer in a superimposed configuration, and means for recording the image formed in the reversible cholesteric reflection layer or the image formed in the reversible light absorbing layer by controlling the conditions of cooling and heating the recording medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a graph in explanation of the relationship between the color and the temperature of a reversible cholesteric reflection layer for use in a reversible recording medium according to the present invention.

DESCRIPTION OF THE PREFERRED EMBODIMENTS

Figure 1:
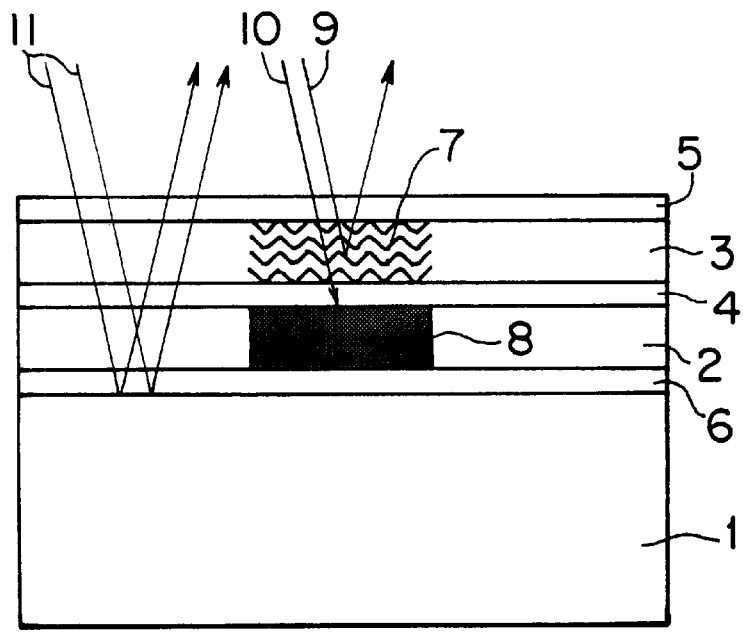
FIG. 1 is a schematic cross-sectional view of a reversible recording medium according to the present invention.

FIG. 1 is a schematic cross-sectional view of a reversible recording medium according to the present invention. In a reversible recording medium shown in FIG. 1, a reversible light absorbing layer 2 and a reversible cholesteric reflection layer 3 are provided on a support 1.

As the reversible light absorbing light 2, there can be used, for example, a reversible thermosensitive coloring layer comprising a coloring composition which comprises an electron-donor coloring compound (which will be hereinafter referred to as a coloring agent) and an electron-acceptor compound (which will be hereinafter referred to as a color developer). The reversible cholesteric reflection layer 3 (which will be hereinafter referred to as a cholesteric reflection layer) comprises a thermotropic liquid crystalline compound capable of assuming a cholesteric liquid crystalline phase or isotropic phase.

When necessary, an intermediate layer 4 may be interposed between the light absorbing layer 2 and the cholesteric reflection layer 3; a surface protection layer 5 may be overlaid on the cholesteric reflection layer 3; and an undercoat layer 6 may be interposed between the support 1 and the light absorbing layer 2, as illustrated in FIG. 1.

With respect to the support 1, there can be employed a sheet of paper or synthetic paper, or a plastic film such as polyethylene terephthalate (PET), polyether sulfone (PES), or polyether imide. Further, a composite material made of the above-mentioned materials, and a glass plate are also usable. The support 1 may be transparent. To prepare a paper-like reversible recording medium of a reflection type, it is preferable that the support 1 be white. It is preferable that the thickness of the support 1 for use in the above-mentioned paper-like reversible recording medium be in the range of 50 to 500 μm, more preferably in the range of about 100 to 300 μm. In the case where the recording medium is not required to be a paper-like medium, for example, in a display apparatus, the support 1 may be a rigid plate, and the thickness thereof is not particularly limited.

As the surface protection layer 5, a glass plate, or a plastic film having excellent transparency and heat resistance, such as a film of polyether sulfone (PES) or polyether imide is preferably employed. Alternatively, a surface protection layer may be provided in such a manner that a photo-setting resin is coated on the cholesteric reflection layer 3, and subjected to curing treatment. In this case, an ultraviolet-curing resin with high transparency and excellent mechanical strength is preferably used as the photo-setting resin. The ultraviolet-curing resin may comprise a filler such as silica particles in order to further enhance the mechanical strength.

It is preferable that the thickness of the surface protection layer 5 be in the range of about 1 to 30 μm when thermal energy is applied to the side of the surface protection layer 5 using a contact-type heater such as a thermal head. In this case, when the thickness of the surface protection layer 5 is less than 1 μm, the surface protection layer 5 is easily damaged due to its insufficient mechanical strength. When the thickness of the surface protection layer 5 exceeds 30 μm, thermal conduction to the cholesteric reflection layer 3 and the light absorbing layer 2 is not efficient.

When thermal energy is imagewise applied to the side of the surface protection layer 5 of the reversible recording medium using, for example, a thermal head for image recording, the heat-applied portion of the cholesteric reflection layer 3 can assume a fixed cholesteric phase, whereby there is formed in the cholesteric reflection layer an image 7 showing an iridescent color of the cholesteric phase by selective reflection. Simultaneously with the image formation in the cholesteric reflection layer 3, color development takes place at a portion in the light absorbing layer 2 corresponding to the image 7 in the cholesteric reflection layer 3 if the temperature of the light absorbing layer 2 reaches a color development temperature of the colouring composition for use in the light absorbing layer 2. The color-developed image portion 8 thus obtained in the light absorbing layer 2 is substantially analogous to the image portion 7 formed in the cholesteric reflection layer. The color-developed image portion 8 can work as a light absorbing portion for observing the image portion 7 with the iridescent color by selective reflection.

As shown in FIG. 1, when light is applied to the recording medium, a light ray 9 with a particular wavelength (provided that one of levorotatory or dextrorotatory light) is selectively reflected by the above-mentioned image portion 7 in the cholesteric reflection layer 3, and a light ray 10 with other wavelengths than the above-mentioned wavelength of the light ray 9 passes through the image portion 7 and enters the light absorbing layer 2.

When the color-absorbing image portion 8 formed in the light absorbing layer 2 assumes a black color, all the wavelengths entering the color-developed image portion 8 formed in the light absorbing layer 2 are absorbed therein. Therefore, the image portion 7 formed in the cholesteric reflection layer 3 is visible as a clear iridescent color image by selective reflection because only the light 9 is reflected by the image portion 7.

When the color-developed image portion 8 formed in the light absorbing layer 2 assumes other colors than black, for example, a blue color, the image portion 7 is visible as an additive mixture of colors obtained by reflected light from the blue color image portion formed in the light absorbing layer 2 and reflected light from the cholesteric reflection layer 3.

Further, the cholesteric reflection layer 3 can be made transparent by appropriately controlling the thermal recording conditions, while a color-developed image portion such as a black or blue image portion can be formed in the light absorbing layer 2. In such a case, the black or blue image is visible as it is.

As previously explained, reversible recording is carried out in the cholesteric reflection layer so as to produce iridescent color images by selective reflection, and at the same time, an image is reversibly formed at a portion in the light absorbing layer corresponding to the image portion in the cholesteric reflection layer.

In addition, when the support 1 is white, light rays 11 entering the support 1 are all reflected, so that a non-image portion can be visually recognized as a white color.

Therefore, reversible recording of multi-color images can be achieved with high contrast between the image portion and the non-image portion.

The reversible cholesteric reflection layer 3 will be explained in more detail.

The reversible cholesteric reflection layer comprises a thermotropic liquid crystalline compound which has memory characteristics. Further, the above-mentioned liquid crystalline compound assumes a cholesteric liquid crystalline phase showing iridescent colors ranging from blue to red depending on the temperature, and an isotropic phase showing a transparent state when heated at a temperature above the glass transition temperature, with the above-mentioned selective reflection state and the transparent state being fixed at a temperature lower than the glass transition temperature.

The above-mentioned thermotropic liquid crystalline compounds for use in the cholesteric reflection layer may comprise a polymeric cholesteric liquid crystalline compound.

As the polymeric cholesteric liquid crystalline compound for use in the present invention, a polymeric cholesteric liquid crystalline compound with a side chain is preferable. In particular, a copolymer of a nematic monomer and a cholesteric monomer is preferably employed in the present invention. In addition to the above, any polymeric liquid crystalline compounds capable of showing selective reflection, as described in Japanese Laid-Open Patent Applications 4-174415 and 6-273707, are usable.

The polymeric cholesteric liquid crystalline compound assumes a liquid crystalline phase with cholesteric orientation between the glass transition temperature (Tg) and the isotropic phase transition temperature (Tc). At that time, the cholesteric liquid crystalline phase shows iridescent colors obtained by selective reflection. When the liquid crystalline phase with the cholesteric orientation is cooled to a temperature lower than the glass transition temperature (Tg), the cholesteric liquid crystalline state can be fixed.

It is preferable that the weight-average molecular weight of the polymeric cholesteric liquid crystalline compound for use in the present invention be in the range of 10,000 to 500,000. When the weight-average molecular weight is within the above-mentioned range, preservation stability of the recorded state is satisfactory, and the time required for the image recording and image erasure is acceptable.

One example of the polymeric cholesteric liquid crystalline compound is represented by the following formula (IV):

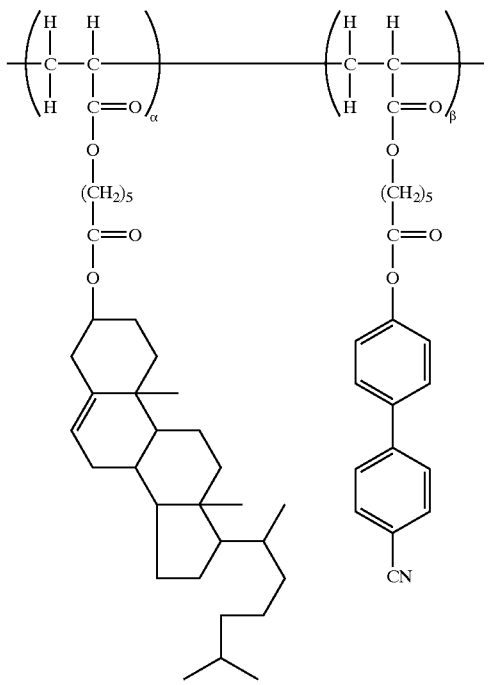

(IV)

In general, there is the problem that the recording time and the erasing time become relatively long when the polymeric cholesteric liquid crystal is used. In addition, when the glass transition temperature (Tg) of the employed liquid crystalline compound is low, the preservation stability of the fixed state is lowered. Namely, there is a risk of the fixed state disappearing at room temperature. In light of such a factor, it is preferable that the cholesteric liquid crystalline compound for use in the cholesteric reflection layer have a glass transition temperature (Tg) of 30° C. or more. When the recording medium or apparatus of the present invention is designed to operate only under the circumstances of low temperature, the glass transition temperature (Tg) of the employed cholesteric liquid crystalline compound is not particularly limited, and it may be at least above the operating temperature.

To increase the recording speed and improve the preservation stability, it is preferable to employ a cholesteric liquid crystalline compound with a molecular weight of 90 to 10,000, preferably 1,000 to 2,000, with no distributed molecular weight. The above-mentioned cholesteric liquid crystalline compound will be hereinafter referred to as a medium-molecular weight cholesteric liquid crystalline compound. A plurality of medium-molecular weight cholesteric liquid crystalline compounds may be used in combination.

When a medium-molecular weight cholesteric liquid crystalline compound is heated so as to assume an isotropic phase or a cholesteric liquid crystalline phase, and thereafter rapidly cooled to the glass transition temperature or less, or to room temperature, the isotropic phase or the cholesteric liquid crystalline phase is changed into a glassy solid phase (hereinafter referred to as a cholesteric glass phase), with the molecular arrangement previously obtained by heat treatment being maintained. The thus obtained cholesteric glass phase shows iridescent colors obtained by selective reflection.

When the molecular weight of the above-mentioned cholesteric liquid crystalline compound is less than 900, crystallization takes place during the rapid cooling, so that the cholesteric glass phase of the liquid crystalline compound cannot be fixed. The reason for this is considered that molecular orientation changes very quickly by rapid cooling. When the molecular weight of the cholesteric liquid crystalline compound exceeds 10,000 the recording and erasing operations become unpractical. To be more specific, it becomes impossible to complete the recording or erasing operation of one picture element in several hundreds of milliseconds or less.

After the medium-molecular weight cholesteric liquid crystalline compound is heated so as to assume an isotropic phase, and thereafter, cooled to a temperature where the liquid crystalline compound exhibits a cholesteric liquid crystalline phase showing iridescent colors, the iridescent colors can be fixed by rapid cooling. After that, the liquid crystalline compound is heated again to cause crystallization. Alternatively, the liquid crystalline compound exhibiting the iridescent colors is heated again to a temperature where the liquid crystalline compound assumes the isotropic phase, and rapidly cooled so that at least the part of the compound assumes an amorphous state. By following any of the above-mentioned procedures, the cholesteric liquid crystalline compound assumes a white opaque state, thereby displaying a white color.

It is preferable that the cholesteric liquid crystalline compound for use in the cholesteric reflection layer comprise a medium- or low-molecular weight cholesteric liquid crystalline compound with a molecular weight of 2,000 or less and a glass transition temperature of 30° C. or more.

It is further preferable that the medium- or low-molecular weight cholesteric liquid crystalline compound comprise at least a liquid crystalline compound of the following formula (I) and/or a liquid crystalline compound of the following formula (II):

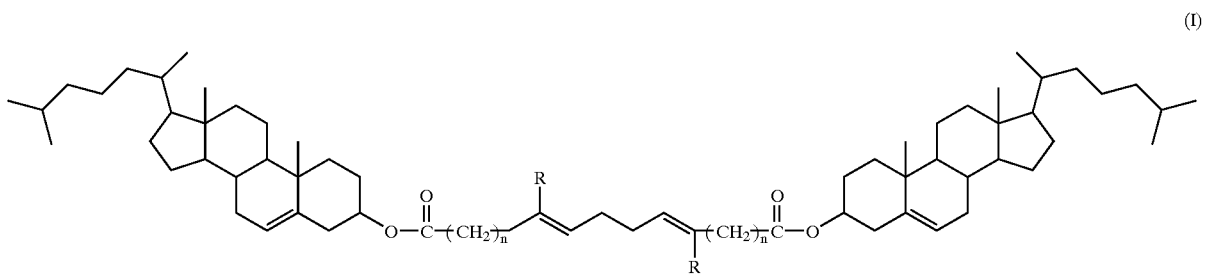

(I)

wherein n is 5, 6, or 7; and R is H or $CH_3$.

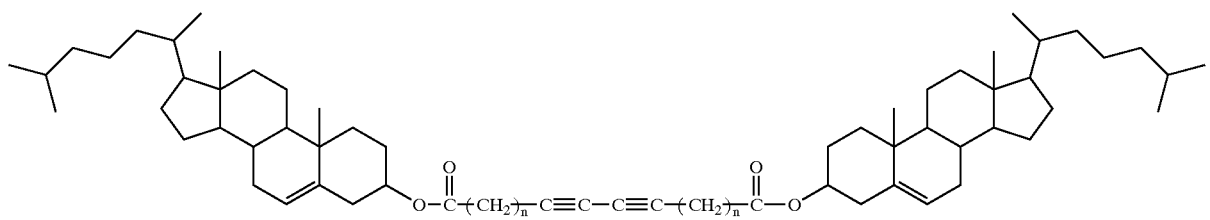

(II)

wherein n is an integer of 2 to 10.

A mixture of the above-mentioned cholesteric liquid crystalline compounds represented by formula (I) or (II) wherein the integer represented by n is different may be employed in the present invention. The cholesteric liquid crystalline compounds of formulas (I) and (II) may be used in combination.

Each of the liquid crystalline compounds (I) and (I) can assume a cholesteric liquid crystalline phase when heated at a temperature higher than the glass transition temperature, and an isotropic phase when heated at a temperature higher than the above-mentioned temperature where the compound assumes the cholesteric liquid crystalline phase.

In particular, the cholesteric liquid crystalline compound of the following formula (V), wherein the integer represented by n in formula (II) is 8, that is, dicholesteryl 10,12-docosadiynedioate, is preferable. This is because the stability of the fixed color obtained by reflection of cholesteric pitch is excellent.

medium is allowed to stand under the circumstances of high temperature. In other words, crystallization of the cholesteric glass phase can be restrained. Therefore, images recorded in the recording medium can be prevented from deteriorating even though the recording medium is allowed to stand at high temperatures, for example, left in a car in the summer.

The previously mentioned cholesteric liquid crystalline compounds may be used in combination in the present invention.

It is preferable that the cholesteric reflection layer consist of a liquid crystalline compound capable of exhibiting selective reflection. However, the cholesteric reflection layer may further comprise a binder resin and a spacer powder.

Examples of the binder resin for use in the cholesteric reflection layer include poly(vinyl chloride), poly(vinyl acetate), epoxy resin, phenoxy resin, acrylic resin, polyurethane, and polyester.

For instance, a liquid crystalline compound and a binder resin may be dissolved in an appropriate solvent to prepare

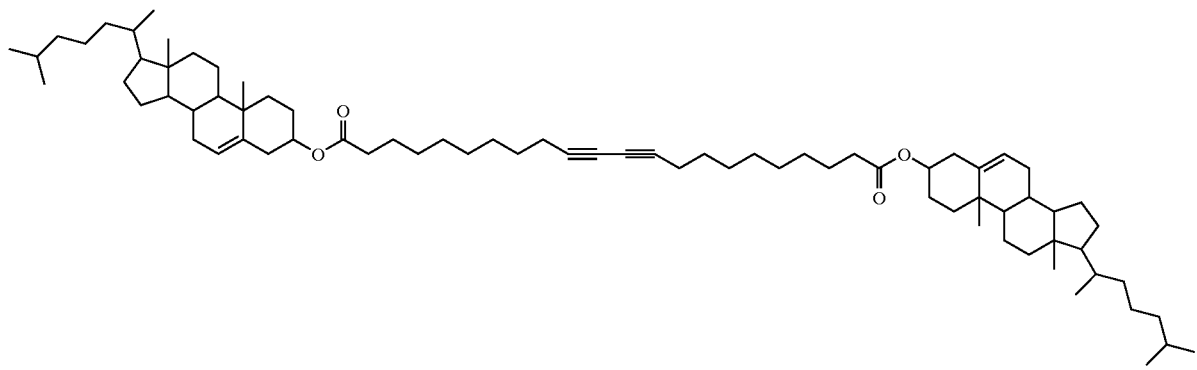

Furthermore, it is preferable that the medium- or low-molecular weight cholesteric liquid crystalline compound for use in the present invention comprise the following cholesteric liquid crystalline compound represented by formula (III):

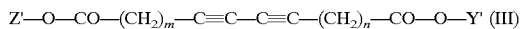

wherein Z' and Y' are each independently a dihydrocholesteryl group, a hydrogen atom, or an alkyl group, provided that at least one of Z' or Y' represents a dihydrocholesteryl group; and m and n are each independently an integer of 1 or more.

When the above-mentioned cholesteric liquid crystalline compound of formula (III) is used for the reversible cholesteric reflection layer, preservation stability of the cholesteric glass phase is improved even though the recording a coating liquid. After coating of the cholesteric reflection layer coating liquid, the solvent component is evaporated to provide a cholesteric reflection layer.

Alternatively, the reversible cholesteric reflection layer may be prepared by mixing the medium- or low-molecular weight cholesteric liquid crystalline compound, a prepolymer, and a polymerization initiator, and causing a polymerization reaction, for example, photopolymerization or heat polymerization. In this case, the medium- or low-molecular weight cholesteric liquid crystalline compound forms domains in the polymeric binder agent in the obtained cholesteric reflection layer.

As the above-mentioned spacer powder, there can be used a spherical powder and a cylindrical powder which are conventionally used for general-purpose liquid crystal display. The spacer powder is not particularly limited.

The kind of means for heating the cholesteric reflection layer to obtain an isotropic phase is not particularly limited.

A proper heating means and proper heating conditions may be selected depending on the required heating speed. For example, a hot plate, a laser beam, and a thermal head are usable.

The kinds of means for rapidly cooling the cholesteric reflection layer to fix the iridescent colors of the cholesteric glass phase is not particularly limited. A proper cooling means and proper cooling conditions may be selected depending on the required cooling speed which is determined by the desired iridescent color. For example, the cholesteric reflection layer may be rapidly cooled by water cooling or air-cooling, or by use of a metallic plate or glass plate.

In general, it is preferable that the wavelength of selective reflection be within the visible light range from about 400 to 700 nm. In this case, the color of selective reflection can be visually recognized. The wavelength of selective reflection may be within the ultraviolet region or infrared region when the image is read by a specific apparatus.

It is preferable that the thickness of the cholesteric reflection layer be in the range of 0.5 to 50 $\mu$m, more preferably 1 to 20 $\mu$m. When the cholesteric reflection layer is too thin, the reflectance at the wavelength of the reflection peak is decreased, so that contrast of the image display becomes poor. When the cholesteric reflection layer is excessively thick, conduction of heat to the light absorbing layer 2 is poor.

The reversible light absorbing layer 2 will now be explained in detail.

For the reversible light absorbing layer 2, there can be employed any materials that can absorb light which is permitted to pass through the cholesteric reflection layer 3 under the action of external stimuli. For example, there can be employed a thermosensitive recording material capable of repeatedly causing color development and decolorization by controlling the heating temperature and the cooling speed; a guest-host liquid crystalline material capable of switching the molecular orientation of a dichroic dyestuff by the application of electric field of heat (Japanese Laid-Open Patent Application 10-183117); and a magnetic recording material in which a plate-shaped magnetic powder serves as an optical shutter because the orientation of the magnetic particles is changeable according to the direction of a magnetic field applied thereto (Japanese Laid-Open Patent Application 9-090887).

In the case where the recording principle in the cholesteric reflection layer 3 is different from that in the light absorbing layer 2, the materials and thickness of the light absorbing layer may be optimized so that the recording operation in each layer can be ensured. In any case, it is preferable that the light absorbing layer 2 have such memory characteristics that the light absorbing state, that is, a color-developed state, and the light transmitting state, that is, a decolorized state can be maintained without any application of energy thereto.

When the recording principle of the cholesteric reflection layer 3 is thermal recording, it is preferable that thermal recording be carried out in the light absorbing layer 2. A mixture of a color developer and a coloring agent is usable in the light absorbing layer 2 in order to reversibly switch the light absorbing state (color-developed state) and the light transmitting state (decolorized state) by use of a thermosensitive recording apparatus, and in addition, to maintain the above-mentioned states without any application of energy thereto.

Reversible recording operation of the light absorbing layer 2 can be achieved by use of the combination of a color developer and a coloring agent. Not only such a combination, but also any materials capable of reversibly assuming a color-developed state and a decolorized state by the application of heat thereto are usable.

The color developer for use in the light absorbing layer 2 has a molecular structure provided with a capability of inducing color formation in the coloring agent, and has a long-chain aliphatic group moiety in the molecule thereof. To prepare a reversible thermosensitive coloring composition, a proper combination of the color developer and the coloring agent is selected. For instance, a mixture of a color developer and a coloring agent is fused by the application of heat thereto, and thereafter rapidly cooled, thereby preparing a color-developed sample. The sample thus prepared is subjected to differential scanning calorimetry (DSC) or differential thermal analysis to investigate whether the sample exhibits an exothermic phenomenon or not during the heating step. The sample composition exhibiting an exothermic phenomenon in the heating step is acceptable as the reversible thermosensitive coloring composition in the present invention. Namely, the above-mentioned reversible thermosensitive coloring composition can assume a color-developed state when heated at a temperature that is higher than the color development temperature, and thereafter rapidly cooled. When the coloring composition in the color-developed state is again heated, decolorization readily takes place at a temperature that is lower than the color development temperature. A decolorization promoting agent may be added to such a reversible thermosensitive coloring composition.

As previously mentioned, the color developer for use in the reversible light absorbing layer 2 has not only a molecular structure having a capability of inducing color formation in the coloring agent, but also a long-chain aliphatic group moiety in the molecule which controls the cohesion between the molecules thereof.

Representative examples of the color developers for use in the present invention include an organic phosphoric acid compound, an aromatic or aliphatic carboxylic acid compound, and a phenol compound, each having an aliphatic group with 12 or more carbon atoms.

Examples of such an aliphatic group include a straight-chain or branched alkyl group and alkenyl group, and each may have a substituent such as a halogen atom, an alkoxy group, or an ester group. Specific compounds are described in Japanese Laid-Open Patent Application 10-151859, but the color developers for use in the present invention are not limited to those compounds.

As the coloring agent for use in the reversible light absorbing layer 2, an electron-donor coloring compound can be employed. There is no particular limitation to such an electron-donor coloring compound as long as it is a colorless or light-colored dye precursor. There can be employed conventional electron-donor coloring compounds, for example, fluoran compounds, phenothiazine compounds, leuco auramine compounds, phthalide compounds, and aza-phthalide compounds. Specific examples of those compounds are listed in Japanese Laid-Open Patent Application 10-95175, but the coloring agents for use in the present invention are not limited thereto.

The reversible light absorbing layer 2 may further comprise a decolorization promoting agent. As the decolorization promoting agent, there can be employed a low-melting point compound or a high-melting point compound, for example, fatty acids, fatty acid derivatives, fatty acid metallic salts, waxes and fats and oils, higher alcohols, phosphate, benzoate, phthalate, oxy acid ester compounds, silicone oil, liquid crystalline compounds, and surface active agents, each having a long-chain hydrocarbon group.

The mixing ratio of the coloring agent to the color developer for use in the reversible light absorbing layer 2 is determined in light of the physical properties of the employed compounds. It is preferable that the color developer be in an amount of 1 to 20 moles, more preferably 2 to 10 moles, to one mole of the coloring agent. When the amount ratio of the color developer is too small, the decolorization performance is unsatisfactory. When the amount ratio of the color developer is too large, the coloring density tends to be low.

The light absorbing layer 2 may further comprise a binder resin for retaining the coloring agent and the color developer in the form of a layer.

Examples of the binder resin for use in the light absorbing layer 2 include poly(vinyl chloride), poly(vinyl acetate), vinyl chloride—vinyl acetate copolymer, polystyrene, styrene copolymers, phenoxy resin, polyester, aromatic polyester, polyurethane, polycarbonate, polyacrylate, polymethacrylate, acrylic acid copolymers, maleic acid copolymers, and polyvinyl alcohol.

The color developer and the coloring agent may be held in microcapsules. Such microcapsules of the color developer and the coloring agent can be prepared by the conventional methods, such as coacervation, interfacial polymerization, and in-situ polymerization.

The light absorbing layer 2 is provided by the conventional method. More specifically, a coloring agent and a color developer are uniformly dispersed or dissolved in water or an organic solvent together with a binder agent, to prepare a coating liquid. The coating liquid thus prepared is coated on the support 1 and dried, whereby a light absorbing layer 2 is provided on the support 1. When the binder agent is not employed, a mixture of the color developer and the coloring agent is fused to prepare a film, followed by cooling, whereby a light absorbing layer 2 can be provided. The binder resin for use in the light absorbing layer 2 serves to maintain the uniformly dispersed state of the reversible thermosensitive coloring composition even after color development and decolorization are repeated many times. In particular, the composition tends to aggregate by the application of heat thereto during the process of color development. Therefore, a binder resin with high heat resistance is preferably employed in the light absorbing layer 2.

The reversible recording characteristics of the recording medium according to the present invention will now be explained in detail.

To record an image in the reversible recording medium of the present invention, a predetermined thermal energy is imagewise applied to the recording medium to heat the cholesteric reflection layer 3 and the light absorbing layer 2, and thereafter the heated portions is rapidly cooled. In this case, the recording medium may be heated in an imagewise manner for a short period of time using a thermal head or a laser beam. Such a heating means as the thermal head or laser beam can locally heat the recording medium. Therefore, the accumulated heat is diffused immediately after completion of heating, which makes it possible to rapidly cool the recording medium. Thus, a recorded state can be fixed.

To release the recorded state, on the other hand, the image portions may be heated for a relatively long period of time using an appropriate heat source, and thereafter cooled. Alternatively, the image portions may be temporarily heated at the respective temperatures for erasing the recorded images. When the heat is applied to the recording medium for a relatively long period of time, as mentioned above, the heated area is considerably wide. Therefore, after the heating process is finished, the recording medium is gradually cooled, so that image erasure takes place in the course of such a gradual cooling process. In this case, a heat roller, heat stamp, or hot air is suitable. In addition to the above, the recording medium may be heated for a relatively long time using a thermal head. Further, a laser beam is usable. By use of $CO_2$ laser with a high output, the cholestic reflection layer can be heated very efficiently without a layer for absorbing visible light. To heat the cholesteric reflection layer and the light absorbing layer at a temperature where the colored image can be erased, for example, the energy applied to a thermal head may be slightly decreased as compared with the applied energy in the recording operation by controlling the voltage and pulse width applied to the thermal head. This method enables a single thermal head to carry out both the recording and the erasing operations. The so-called overwriting operation becomes possible. As a matter of course, the image portion may be heated to the temperature where the image can be erased by use of the heat roller and heat stamp, as stated above. Further, a light source may also be used for image erasure. In this case, since the colored image portion is ready to absorb light, the image portion can be efficiently heated.

Figure 2:
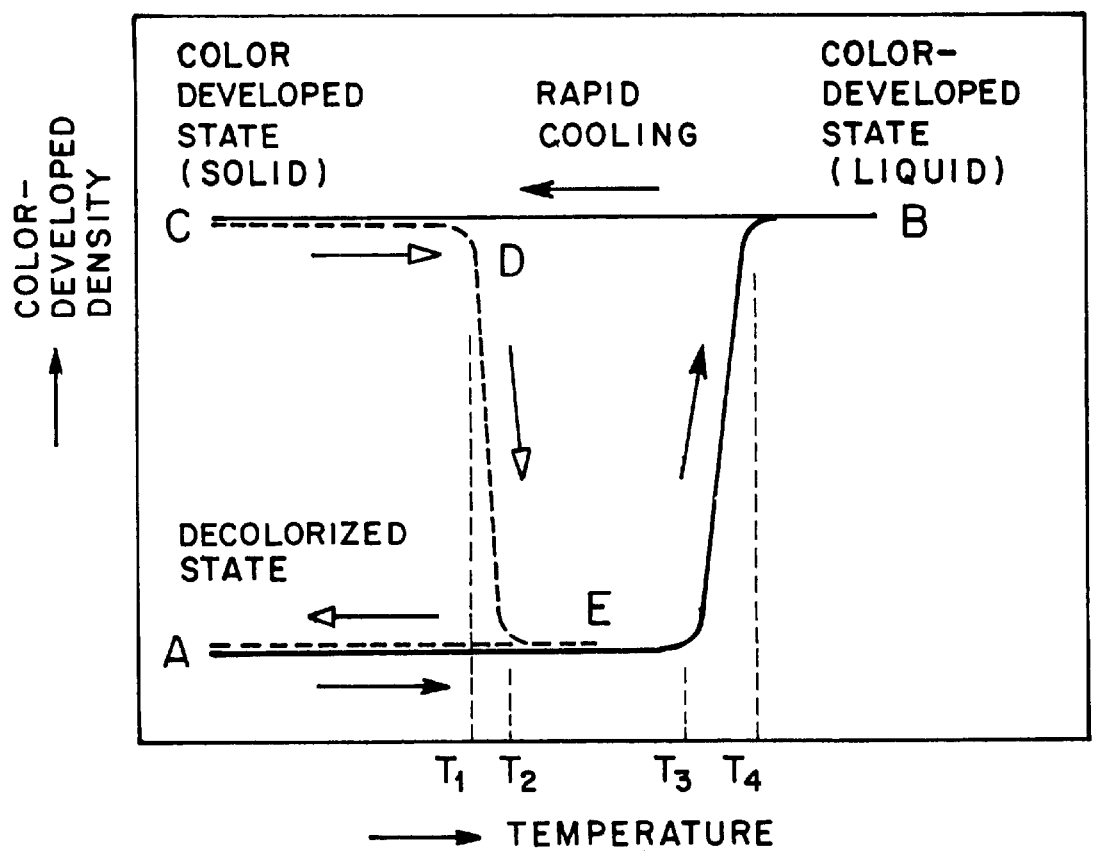
FIG. 2 is a graph in explanation of the relationship between the color-developed density and the temperature of a reversible light absorbing layer for use in a reversible recording medium according to the present invention.

With reference to FIG. 2, color development and decolorization phenomenon in the light absorbing layer 2 will be explained in detail.

FIG. 2 shows the relationship between the color-developed density of the above-discussed reversible thermosensitive coloring composition for use in the light absorbing layer 2 and the temperature thereof. The abscissa axis of the graph indicates the temperature of the reversible thermosensitive coloring composition, and the ordinate axis indicates the color-developed density thereof.

In FIG. 2, reference symbol A shows a decolorized state of the reversible thermosensitive coloring composition at room temperature; reference symbol B shows the color-developed state of the composition which is in a fused form; and reference symbol C shows the color-developed state of the composition in a solid form at room temperature.

When the temperature of the coloring composition in the decolorized state A is raised and reaches a temperature $T_3$, the color development starts. The temperature $T_2$ is referred to as a color development initiating temperature. When the temperature reaches $T_4$, the color-developed density of the composition is saturated, and the composition is fused and assumes the color-developed state B. The temperature $T_4$ is referred to as a color development saturation temperature.

When the composition in the state B is rapidly cooled to room temperature, the composition is returned to a solid form in a color-developed state C, with the color-developed density being maintained. Color development is caused and fixed, passing along the route indicated by the solid line of A—B—C.

When the temperature of the solid composition in the color-developed state C is raised again, the color-developed density of the composition in a state D starts to decrease at a temperature $T_1$, which is referred to as a decolorization initiating temperature, and the composition assumes a complete decolorized state E at a temperature $T_2$. When the composition in the complete decolorized state E is cooled, the composition is returned to the initial decolorized state A. The decolorization is caused and fixed, passing along the route indicated by the broken line of C—D—E—A.

The temperature region ranging from the decolorization temperature $T_2$ to the color development initiating temperature $T_3$ is regarded as a decolorization temperature region of the reversible thermosensitive coloring composition. One of the features of the above-discussed color development and decolorization phenomenon is that the above-mentioned decolorization temperature region is situated below the temperature where the composition is fused and causes color development. Therefore, the color-developed state of the composition maintained at room temperature can change into a decolorized state by raising the temperature of the color-developed composition from room temperature to a temperature within the decolorization temperature region. Further, color development and decolorization can be reversibly repeated many times.

FIG. 2 shows one of the representative examples of the color development and decolorization phenomenon in the light absorbing layer for use in the present invention. Each of the temperatures $T_1$ to $T_4$ shown in FIG. 2 is determined depending upon the combination of materials for use in the coloring composition. In addition, the color-developed density of the fused composition in the color-developed state B does not necessarily coincide with that of the solid composition in the color-developed state C.

The reflection and transmission phenomenon of the cholesteric reflection layer 3 will now be explained with reference to FIG. 3.

FIG. 3 is a graph which shows the relationship between the color of a recorded portion in a reversible cholesteric reflection layer comprising a medium-molecular weight cholesteric liquid crystalline compound and the temperature thereof. In FIG. 3, the abscissa axis of the graph indicates the temperature of the cholesteric reflection layer, and the ordinate axis indicates the color visually observed.

The cholesteric liquid crystalline compound assumes a crystalline phase (a) at room temperature. When the liquid crystalline compound in the crystalline phase (a) is heated at a temperature $T_6$ or more, the compound is fused and the crystalline phase (a) changes into an isotropic phase (b). The temperature $T_6$ is referred to as an isotropic phase transition temperature.

When the liquid crystalline compound in the isotropic phase (b) is rapidly cooled to the glass transition temperature Tg (not shown) or lower, the liquid crystalline compound assumes a transparent amorphous phase (c) at room temperature. The amorphous phase (c) can be fixed at room temperature.

In the case where the liquid crystalline compound in the above-mentioned isotropic phase (b) is cooled, the liquid crystalline compound passes through a temperature region where the liquid crystalline compound can assume a cholesteric liquid crystalline phase (e). The result is that various iridescent colors ($e_B$, $e_C$ and $e_R$) ranging from blue to red are produced by selective reflection corresponding to the respectively temperatures in the gradual cooling process. For instance, when dicholesteryl 10,12-docosadiynedioate represented by formula (V), having a molecular weight of 1099.8 and a glass transition temperature of 80° C. is employed, it produces a blue color ($e_B$) of 430 nm at about 115° C., and a red color ($e_R$) of 610 nm at about 87° C.

When each iridescent color ($e_B$, $e_C$, or $e_R$) is independently produced, the liquid crystalline compound is rapidly cooled to the glass transition temperature (Tg) or less. The result is that the liquid crystalline compound assumes a cholesteric glass phase ($f_B$, $f_G$, or $F_R$) at room temperature, with the iridescent color being separately fixed. Alternatively, by changing the temperature at which the rapid cooling starts and the rate for rapid cooling, it is possible for the liquid crystalline compound in the isotropic phase (b) to assume the amorphous phase (c) or the cholesteric glass phase ($f_B$, $f_G$, or $F_R$) by one operation.

When the liquid crystalline compound in the amorphous phase (c) or the cholesteric glass phase (f), which is stable at room temperature, is heated again, crystallization takes place at a temperature $T_5$, which is referred to as a crystallization temperature, and the compound assumes a white opaque state (d). When the liquid crystalline compound in the white opaque state (d) is cooled to room temperature, the state of the liquid crystal is returned to the crystalline phase (a).

When the liquid crystalline compound in the cholesteric liquid crystalline phase (e) is gradually cooled, the cholesteric liquid crystalline phase (e) changes into a crystalline phase (a) as shown in FIG. 3, or a transparent state (not shown). It is supposed that the crystalline structure obtained by heating again the compound in the cholesteric glass phase (f) is different from that obtained by gradually cooling the compound in the cholesteric liquid crystalline phase (e). Namely, light scattering performance is considered to be different.

FIG. 3 shows the representative recording characteristics of a liquid crystalline compound for use in the present invention. The isotropic phase transition temperature $T_6$ and the crystallization temperatures $T_5$ are different depending upon the materials to be employed.

In the case where the support 1 is white, it is preferable to initialize the recording medium or carry out the image erasure so that the liquid absorbing layer 2 may be heated at the decolorization temperature $T_2$ or more, followed by cooling. Namely, as long as the decolorization is carried out without fail in the light absorbing layer 2, the recording medium assume a white color as a whole, with no iridescent color being visually recognized, even if the cholesteric reflection layer 3 still exhibits a selective reflection state.

In the case where the support 1 is transparent initialization or image erasure may be carried out by heating the recording medium so that the temperature of the cholesteric reflection layer is higher than the crystallization temperature $T_5$ and the temperature of the light absorbing layer is higher than the decolorization temperature $T_2$, and thereafter cooling the recording medium. In the recording medium of a transmission type, the cholesteric reflection layer is required to be transparent or slightly white opaque at the initial stage. In this case, when the crystallization temperature $T_5$ of the cholesteric reflection layer 3 is higher than the color development initiating temperature $T_3$ of the light absorbing layer 2, there occurs the following problem. Namely, color development occurs once more in the light absorbing layer 2 when the recording medium is heated at the crystallization temperature $T_5$ or more of the cholesteric reflection layer 3 to erase the recorded image. Therefore, it is preferable to select the materials for the recording medium so that the color development initiating temperature $T_3$ of the light absorbing layer 2 is higher than the crystallization temperature $T_5$ of the cholesteric reflection layer 3.

When an image is recorded in the recording medium of the present invention by applying heat to the recording medium in an imagewise manner using a heater such as a thermal head, there is a risk of the outline portion of the recorded image appearing uneven because the heating temperature cannot be made equal throughout the heat-applied portion, and the cooling rate cannot be made equal therein. In such a case, a different iridescent color may be mixed in the outline portion of the recorded image when the light absorbing layer 2 is entirely provided under the cholesteric reflection layer 3. To prevent the color unevenness in the outline portion of the recorded image, it is preferable that the color-developed portion formed in the light absorbing layer 2 be a size smaller than the image recorded in the cholesteric reflection layer 3. In this case, the outline portion of the recorded image, of which the iridescent color may be unfavorably different from that of the center portion thereof, can be prevented from being visually observed. The iridescent color of the recorded image can be thus uniformly observed.

It is preferable that the color development initiating temperature $T_3$ of the light absorbing layer 2 be higher than or equal to the isotropic phase transition temperature $T_6$ of the cholesteric reflection layer 3, that is, $T_3 \geq T_6$, in order to make the size of a color-developed image portion formed in the light absorbing layer 2 smaller than the size of the corresponding image portion formed in the cholesteric reflection layer 3.

When heat is applied to the side of the surface protection layer 5, for example, by use of a thermal head, the temperature in the light absorbing layer 2 tends to be lower than the temperature in the cholesteric reflection layer 3.

Figure 4A:
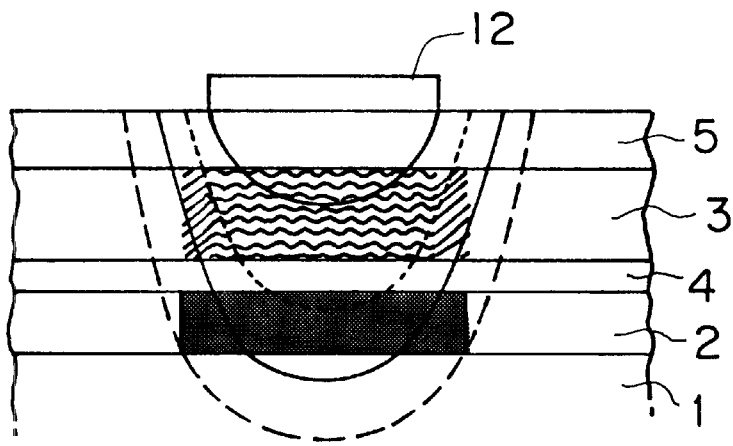
FIG. 4A is a schematic cross-sectional view of one embodiment of a reversible recording medium according to the present invention, in explanation of image formation and temperature distribution in the recording medium.
Figure 5A:
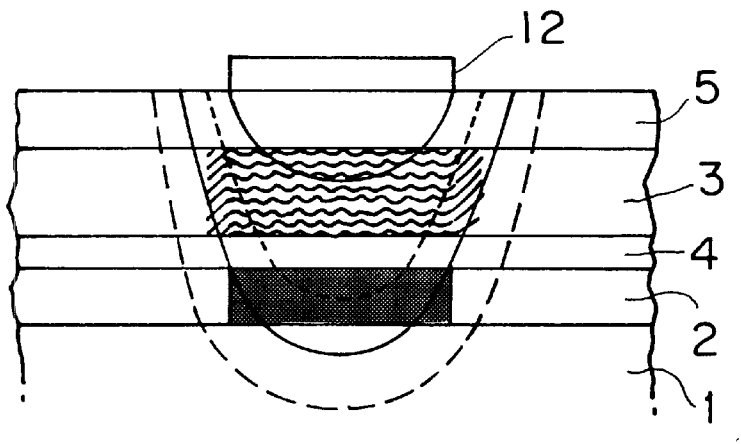
FIG. 5A is a schematic cross-sectional view of another embodiment of a reversible recording medium according to the present invention, in explanation of image formation and temperature distribution in the recording medium.

FIG. 4A and FIG. 5A are each a schematic cross-sectional view of a reversible recording medium, in explanation of distribution of temperature. As shown in FIGS. 4A and 5A, when a heating element 12 is brought into contact with the side of a surface protection layer 5 of the reversible recording medium, the temperature of an area enclosed with a dotted line is relatively high. A curve of the isotropic phase transition temperature ($T_6$) is plotted by a solid line. The temperature is relatively low along a broken line. In the cholesteric reflection layer 3, a portion heated at the isotropic phase transition temperature ($T_6$) or more, and thereafter rapidly cooled is fixed as a recorded image in a cholesteric glass phase. The outline portion (edge portion) of the recorded image in the cholesteric glass phase is liable to display uneven color in comparison with the center portion. This results from non-uniform distribution of temperature in the outline portion.

Figure 4B:
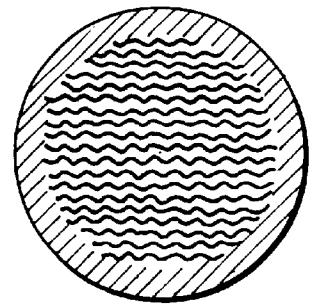
FIG. 4B is a schematic plan view which illustrates the outline portion of the image formed in the reversible cholesteric reflection layer of the recording medium shown in FIG. 4A.

In the case where $T_3 < T_6$, color development takes place in the light absorbing layer 2 in such a manner that the color-developed portion spreads toward the curve indicated by the broken line shown in FIG. 4A. The color-developed portion becomes relatively large. In particular, when the difference between the color development initiating temperature $T_3$ and the color development saturation temperature $T_4$ is small, the area of a color-developed portion with a high color-developed density is also increased. The result is that the unevenness of the iridescent color becomes more distinct in the outline portion of the image recorded in the cholesteric reflection layer 3. The image recorded in the recording medium is such that the outline portion, indicated by a shaded area in FIG. 4B, shows uneven color, when viewed from above.

Figure 5B:
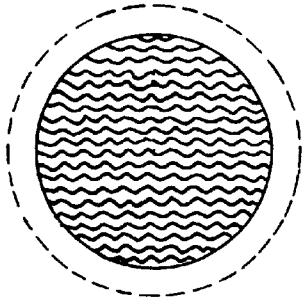
FIG. 5B is a schematic plan view which illustrates the image formed in the reversible cholesteric reflection layer of the recording medium shown in FIG. 5A.

Under the condition of $T_3 \geq T_6$, the color-developed portion in the light absorbing layer 2 can be made smaller than the recorded image in the cholesteric reflection layer 3 without fail, as shown in FIG. 5A. There is no color-developed portion under the outline portion of the recorded image in the cholesteric reflection layer 3 where the iridescent color is uneven. Therefore, only the core portion of the recorded image with a uniform iridescent color can be observed, as shown in FIG. 5B, when viewed from above. Namely, the uneven outline portion indicated by the shaded portion in FIG. 4B is not visually observed in FIG. 5B.

Other features of this invention will become apparent in the course of the following description of exemplary embodiments, which are given for illustration of the invention and are not intended to be limiting thereof.

EXAMPLE 1

[Formation of Light Absorbing Layer]

A compound represented by the following formula (VI) was used as a color developer.

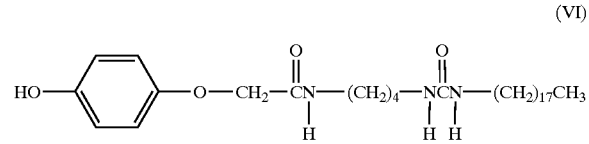

(VI)

The above-mentioned compound of formula (VI), and 2-anilino-3-methyl-6-n-dibutylaminofluoran serving as a coloring agent were mixed and dispersed together with vinyl chloride—vinyl acetate copolymer in methyl ethyl ketone, whereby a coating liquid for light absorbing layer was prepared. The thus prepared coating liquid was coated on a transparent PET film and dried, so that a light absorbing layer with a thickness of about 6 μm was provided on the PET film.

[Formation of Cholesteric Reflection Layer]

A proper amount of cholesteric liquid crystalline compound of the previously mentioned formula (V), that is, dicholesteryl 10,12-decosadiynedioate, was applied to the light absorbing layer provided on the PET film, and heated on a hot plate at 130° C. for 30 seconds until the liquid crystalline compound was completely fused.

A 25-μm-thick PES film, serving as a surface protection layer, was placed on the fused liquid crystalline compound. With another hot plate heated at 130° C. being put on the PES film, the fused liquid crystalline compound was spread until the thickness thereof reached about 10 μm by uniform application of a pressure of 1 kg/cm² thereto. Then, the liquid crystalline compound was gradually cooled at a cooling rate of 5° C./min, whereby a cholesteric reflection layer was provided on the light absorbing layer.

Thus, a reversible recording medium No. 1 of a transmission type according to the present invention was obtained.

The recording characteristics of the light absorbing layer and the cholesteric reflection layer of the reversible recording medium No. 1 were as follows:

(Light absorbing layer)

Decolorization initiating temperature $T_1$: 55° C.

Decolorization temperature $T_2$: 90° C.

Color development initiating temperature $T_3$: 130° C.

Color development saturation temperature $T_4$: 150° C.

(Cholesteric reflection layer)

Crystallization temperature $T_5$: 97° C.

Isotropic phase transition temperature $T_6$: 120° C.

In the fabrication of the recording medium No. 1, the crystalline liquid compound for use in the cholesteric reflection layer was gradually cooled at cooling rate of 5° C./min after heated, as mentioned above. In other words, the recording medium No. 1 was initialized. The light absorbing layer assumed a decolorized state, and the cholesteric reflection layer assumed a transparent state at the initial stage.

An image was recorded in the recording medium No. 1 in such a manner that heat was imagewise applied to the side of the PES film using a thermal head. The recording conditions were as follows:

Dot density: 6 dot/mm

Applied electric power: 0.2 W/dot

Recording speed: 5 m/sec

Pulse width: ranging from several milliseconds to several tens of milliseconds.

Operating temperature: room temperature

Applied energy: 65 mJ/mm$^2$

After thermal recording, the heat-applied portion was rapidly cooled by sending cold air to the outlet of the thermal head. The result was that the light absorbing layer was still in a decolorized state, while the portion of the cholesteric reflection layer subjected to the above-mentioned thermal treatment assumed a cholesteric glass phase, thereby forming an image portion. The image portion with the cholesteric glass phase showed selective reflection of light with a wavelength peak of a red color. When transmitted light was applied to the image portion, the image portion appeared a complementary color, that is, a cyan color.

Similarly, an image was thermally recorded in the recording medium No. 1 with the applied thermal energy being changed from 65 to 85 mJ/mm$^2$. After thermal recording, the heat-applied portion was rapidly cooled in such a manner that cold air was sent to the outlet of the thermal head using a fan. The result was that the portion subjected to the above-mentioned thermal treatment in the light absorbing layer caused color development to produce a black color, and the corresponding portion in the cholesteric reflection layer assumed a cholesteric glass phase. The portion with the cholesteric glass phase selectively reflected light with a wavelength peak of a green color. In this case, light of the complementary color was absorbed by the black-color-developed image portion in the light absorbing layer, so that a green color image was visually observed when reflected light was used. When using transmitted light, a black color image was observed because transmitted light was absorbed by the black-color-developed image portion in the light absorbing layer.

Thereafter, the image-bearing recording medium No. 1 was used as a sheet for an overhead projector (OHP), and the images formed on the recording medium No. 1 were projected using the OHP. As a result, a cyan image and a black image were displayed on a white color background, with high contrast. Namely, multi-color image display was achieved.

The above-discussed image-bearing recording medium No. 1 was entirely heated at 125° C. on the hot plate, and thereafter gradually cooled at a cooling rate of 5° C./min. The black-color-developed image portion formed in the light absorbing layer was erased, and the cholesteric reflection layer totally assumed a transparent state. When light was projected through the thus obtained recording medium No. 1 using the OHP, the recording medium No. 1 assumes a white color as a whole, so that the multi-color images were completely erased.

EXAMPLE 2

[Formation of Light Absorbing Layer]

A compound represented by the following formula (VII) was used as a color developer.

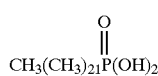

(VII)

The above-mentioned compound of formula (VII), and 2-(o-chlorophenyl)anilino-6-dibutylaminofluoran serving as a coloring agent were mixed and dispersed together with vinyl chloride—vinyl acetate copolymer in methyl ethyl ketone, whereby a coating liquid for light absorbing layer was prepared. The thus prepared coating liquid was coated on a white PET film and dried, so that a light absorbing layer with a thickness of about 6 μm was provided on the white PET film.

[Formation of Cholesteric Reflection Layer]

A proper amount of the same cholesteric liquid crystalline compound as employed in Example 1 was applied to the light absorbing layer provided on the PET film, and heated on a hot plate at 130° C. until the liquid crystalline compound was completely fused.

A 25-μm-thick PES film, serving as a surface protection layer, was placed on the fused liquid crystalline compound. With another hot plate heated at 130° C. being put on the PES film, the fused liquid crystalline compound was spread until the thickness thereof reached about 10 μm by uniform application of a pressure of 1 kg/cm$^2$ thereto. Then, the liquid crystalline compound was gradually cooled at a cooling rate of 5° C./min, whereby a cholesteric reflection layer was provided on the light absorbing layer.

Thus, a reversible recording medium No. 2 of a reflection type according to the present invention was obtained.

The recording characteristics of the light absorbing layer and the cholesteric reflection layer of the reversible recording medium No. 2 were as follows:

(Light absorbing layer)

Decolorization initiating temperature $T_1$: 62° C.

Decolorization temperature $T_2$: 80° C.

Color development initiating temperature $T_3$: 92° C.

Color development saturation temperature $T_4$: 100° C.

(Cholesteric reflection layer)

Crystallization temperature $T_5$: 97° C.

Isotropic phase transition temperature $T_4$: 120° C.

In the fabrication of the recording medium No. 2, the crystalline liquid compound for use in the cholesteric reflection layer was gradually cooled at cooling rate of 5° C./min after heated, as mentioned above. In other words, the recording medium No. 2 was initialized. The light absorbing layer assumed a decolorized state, and the cholesteric reflection layer assumed a transparent state at the initial stage.

An image was recorded in the recording medium No. 2 in such a manner that a thermal energy of 65 mJ/mm$^2$ was imagewise applied to the side of the PES film using a thermal head.

Immediately after thermal recording, the heat-applied portion was rapidly cooled by sending cold air to the outlet of the thermal head. The result was that the heat-applied portion of the light absorbing layer produced a black color. The heat-applied portion of the cholesteric reflection layer assumed a cholesteric glass phase capable of selectively reflecting light with a wavelength peak of a red color. Since the black color image portion in the light absorbing layer functioned as a light absorbing portion, a red color image was visually observed on a white color background.

Similarly, an image was thermally recorded in the recording medium No. 2 with the applied thermal energy being changed from 65 to 85 mJ/mm$^2$. After thermal recording, the heat-applied portion was rapidly cooled in such a manner that cold air was sent to the outlet of the thermal head using a fan.

The result was that the heat-applied portion was fixed as a black color image portion in the light absorbing layer. The portion in the cholesteric reflection layer subjected to the above-mentioned heat treatment assumed a cholesteric glass phase capable of selectively reflecting light with a wavelength peak of a green color.

Similarly, an image was thermally recorded in the recording medium No. 2 with the applied thermal energy being changed to 100 mJ/mm². After thermal recording, the heat-applied portion was rapidly cooled in such a manner that cold air was sent to the outlet of the thermal head using a fan.

The resulting was that the heat-applied portion was fixed as a black color image portion in the light absorbing layer. The portion in the cholesteric reflection layer subjected to the above-mentioned heat treatment assumed a cholesteric glass phase capable of selectively reflecting light with a wavelength peak of a blue color.

Furthermore, an image was thermally recorded in the recording medium No. 2 with the applied thermal energy being changed to 110 mJ/mm². After thermal recording, the heat-applied portion was rapidly cooled in such a manner that cold air was sent to the outlet of the thermal head using a fan.

The result was that the heat-applied portion was fixed as a black color image portion in the light absorbing layer. The portion in the cholesteric reflection layer subjected to the above-mentioned heat treatment assumed a transparent amorphous phase.

In the above-mentioned manner, multi-color images of red, green, blue and black colors were recorded on a paper-like white background.

In the course of formation of multi-color images, the cooling conditions such as the air blowing intensity and the temperature of cold air were appropriately adjusted depending upon the recording conditions.

The green color image formed in the recording medium No. 2 was magnified for observation. A red color was partially observed in the outline portion of the green image. This is because the color development saturation temperature $T_4$ of the light absorbing layer was relatively low, and lower than the isotropic phase transition temperature $T_6$ of the cholesteric reflection layer. Therefore, since the area of the black color image portion in the light absorbing layer was relatively large, uneven selective reflection in the outline portion of the green image due to the non-uniform cholesteric glass phase was made conspicuous. However, uneven color of the outline portion was evaluated as acceptable for practical use.

Then, the recording medium No. 2 was entirely heated at 100° C. on the hot plate, which temperature was slightly higher than the crystallization temperature $T_5$ of the cholesteric reflection layer, and thereafter rapidly cooled. As a result, the cholesteric reflection layer caused crystallization, and became slightly white opaque. However, since the color development initiating temperature $T_3$ of the light absorbing layer was lower than the crystallization temperature $T_5$ of the cholesteric reflection layer, color development took place again in the whole light absorbing layer although the black color image portions were once erased.

Then, the recording medium No. 2 was again entirely heated at 130° C. on the hot plate, and gradually cooled. The result was that decolorization took place in the light absorbing layer, and the cholesteric reflection layer assumed a transparent state.

EXAMPLE 3

The procedure for preparation of the reversible recording medium No. 2 in Example 2 was repeated except that the color developer of formula (VII) and 2-(o-chlorophenyl)anilino-6-dibutylaminofluoran employed in the light absorbing layer in Example 2 were respectively replaced by a compound represented by the following formula (VIII) and 2-anilino-3-methyl-6-n-dibutylaminofluoran.

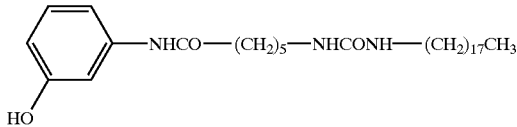

(VIII)

Thus, a reversible recording medium No. 3 of a reflection type according to the present invention was obtained.

The recording characteristics of the light absorbing layer and the cholesteric reflection layer of the reversible recording medium No. 3 were as follows:

(Light absorbing layer)
Decolorization initiating temperature $T_1$: 70° C.
Decolorization temperature $T_2$: 90° C.
Color development initiating temperature $T_3$: 140° C.
Color development saturation temperature $T_4$: 150° C.

(Cholesteric reflection layer)
Crystallization temperature $T_5$: 97° C.
Isotropic phase transition temperature $T_6$: 120° C.

As can be seen from the above, the conditions that $T_3 > T_5$ and $T_4 \geq T_6$ were satisfied in the recording medium No. 3.

Multi-color images were formed in the recording medium No. 3 in the same manner as mentioned in Example 2.

The outline portion of the green color image was magnified for observation. A red color was not visually observed in the outline portion of the green image. This is because the isotropic phase transition temperature $T_6$ is lower than the color development saturation temperature $T_4$. The black color image portion formed in the light absorbing layer was a size smaller than the green image portion recorded in the cholesteric reflection layer, so that the outline portion causing uneven selective reflection was not visually recognized. In this case, the area of the green color image was decreased due to the absence of the above-mentioned outline portion, so that a line image appeared thinner. However, such a line thickness was evaluated as acceptable for practical use.

Then, thermal energy of 55 m/mm² was entirely applied to the recording medium No. 3 using the thermal head until the temperature of the surface of the recording medium reached 110° C., which temperature was higher than the crystallization temperature $T_5$ of the cholesteric reflection layer. At that time, the inner temperature of the light absorbing layer reached 90° C., that is, the decolorization temperature $T_2$ of the light absorbing layer, so that decolorization occurred in the light absorbing layer. Thereafter, the light absorbing layer did not cause color development because the color development initiating temperature $T_3$ of the light absorbing layer was set to be much higher than the crystallization temperature $T_5$ of the cholesteric reflection layer in the recording medium No. 3. The cholesteric reflection layer crystallized at the crystallization temperature $T_5$, and became slightly white opaque, so that the recording medium No. 3 entirely assumed a white color. Thus, the recorded multi-color images were completely erased.

COMPARATIVE EXAMPLE 1

A proper amount of the same cholesteric liquid crystalline compound as employed in Example 1 was applied to a black PET film, and heated on a hot plate at 130° C. until the liquid crystalline compound was completely fused.

A 25-μm-thick PES film was placed on the fused liquid crystalline compound. The fused liquid crystalline compound was spread until the thickness thereof reached about 10 μm by application of uniform pressure thereto. Then, the liquid crystalline compound was gradually cooled, whereby a cholesteric reflection layer was provided on the black PET film.

Thus, a comparative reversible recording medium No. 1 of a reflection type was obtained.

The recording characteristics of the cholesteric reflection layer for use in the comparative reversible recording medium No. 1 were as follows:

Crystallization temperature $T_5$: 97° C.

Isotropic phase transition temperature $T_6$: 120° C.

In the fabrication of the comparative recording medium No. 1, the liquid crystalline compound for use in the cholesteric reflection layer was gradually cooled, as mentioned above. In other words, the comparative recording medium No. 1 was initialized. The cholesteric reflection layer assumed a transparent state at the initial stage.

Thermal recording was carried out in the comparative recording medium No. 1 in the same manner as in Example 2. The result was that a red color image, a green color image, and a blue color image were recorded on the black color background.

Thermal energy of 45 mJ/mm² was imagewise applied to the comparative recording medium No. 1 to form a white image on the black color background. The heat-applied portion in the cholesteric reflection layer crystallized to assume a white opaque state. A white image was thus formed in the cholesteric reflection layer, but the degree of whiteness of the obtained white image was insufficient. It was considered that the cholesteric reflection layer was too thin to record a white image therein.

EXAMPLE 4

The procedure for preparation of the reversible recording medium No. 2 in Example 2 was repeated except that the cholesteric liquid crystalline compound of formula (V) for use in the cholesteric reflection layer in Example 2 was replaced by a mixture of the cholesteric liquid crystalline compound of formula (V) and a cholesteric liquid crystalline compound of the following formula (III') at a mixing ratio by weight of 9:1.

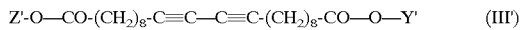

Z'—O—CO—(CH$_2$)$_8$-C≡C—C≡C-(CH$_2$)$_8$-CO—O—Y'  (III')

wherein Z' and Y' are each a dihydrocholesteryl group.

Thus, a reversible recording medium No. 4 according to the present invention was obtained.

Thermal recording was carried out in the reversible recording medium No. 4 to form multi-color images in the same manner as in Example 2.

Although the composition of the cholesteric reflection layer was different from that employed in Example 2, the coloring performance corresponding to the respective amounts of applied thermal energy was similar to that of the recording medium No. 2. As a result, multi-color images of red, green, blue and black colors were recorded on a paper-like white color background.

The multi-color images formed in the reversible recording medium No. 2 and the reversible recording medium No. 4 were allowed to stand at 55° C. for 24 hours to evaluate the preservation stability of the recorded images.

In the recording medium No. 2, the multi-color images with the cholesteric glass phase partially crystallized after 24 hours. The color-developed densities of the black color image portions formed in the light absorbing layer did not change after the storage. Therefore, black spots were visually observed in the multi-color images after storage.

In contrast to this, no crystallization occurred in the cholesteric glass phase of the multi-color images in the recording medium No. 4. It was considered that the preservation stability of the cholesteric glass phase of the cholesteric reflection layer was improved.

Japanese Patent Application No. 11-049051 filed on Feb. 25, 1999 is hereby incorporated by reference.

What is claimed is:

1. A reversible recording medium comprising:
   a support;
   a reversible light absorbing layer formed on said support, and
   a reversible cholesteric reflection layer formed on said reversible light absorbing layer, comprising a cholesteric liquid crystalline compound capable of assuming a cholesteric liquid crystalline phase reversibly showing iridescent colors by selective reflection;
   wherein said reversible light absorbing light is capable of causing a reversible thermosensitive coloring reaction.

2. The reversible recording medium as claimed in claim 1, wherein said reversible light absorbing layer comprises a coloring composition which comprises at least an electron-donor coloring compound and an electron acceptor compound, said composition being capable of reversibly assuming a color-developed state and a decolorized state depending upon heating and cooling conditions.

3. The reversible recording medium as claimed in claim 2, wherein said color-developed state and said decolorized state of said coloring composition are reversibly changeable in such a manner that:
   said coloring composition is in said decolorized state in the form a solid at room temperature,
   said decolorized state turns into said color-developed state by heating, with said color-developed state being maintained at room temperature by rapid cooling, and
   said color-developed state turns into said decolorized state by heating, with said decolorized state being maintained at room temperature by cooling.

4. The reversible recording medium as claimed in claim 2, wherein said color-developed state of said reversible light absorbing layer produced a black color.

5. The reversible recording medium as claimed in claim 2, wherein said coloring composition for use in said reversible light absorbing layer has a color development initiating temperature $T_3$, and said liquid crystalline compound for use in said reversible cholesteric reflection layer has a crystallization temperature $T_5$, wherein $T_3 > T_5$.

6. The reversible recording medium as claimed in claim 2, wherein said coloring composition for use in said reversible light absorbing layer has a color development initiating temperature $T_3$, and said liquid crystalline compound for use in said reversible cholesteric reflection layer has an isotropic phase transition temperature $T_6$, wherein $T_3 \geq T_6$.

7. The reversible recording medium as claimed in claim 1, wherein said cholesteric liquid crystalline compound assumes an isotropic phase by heating, and said isotropic phase turns into a transparent amorphous phase by rapid cooling, with said transparent amorphous phase being maintained at room temperature.

8. The reversible recording medium as claimed in claim 7, wherein said isotropic phase turns into said cholesteric liquid crystalline phase capable of showing said iridescent colors depending upon temperature by cooling, and said cholesteric liquid crystalline phase turns into a cholesteric glass phase by rapid cooling, with said iridescent colors being maintained at room temperature.

9. The reversible recording medium as claimed in claim 8, wherein said cholesteric glass phase turns into a crystalline phase by heating, with said crystalline phase being maintained at room temperature.

10. The reversible recording medium as claimed in claim 1, wherein said cholesteric liquid crystalline compound comprises a polymeric cholesteric liquid crystalline compound.

11. The reversible recording medium as claimed in claim 1, wherein said cholesteric liquid crystalline compound comprises a medium- or low-molecular weight cholesteric liquid crystalline compound with a molecular weight of 2,000 or less and a glass transition temperature of 30° C. or more.

12. The reversible recording medium as claimed in claim 11, wherein said reversible cholesteric reflection layer further comprises a polymeric binder agent, with said medium- or low-molecular weight cholesteric liquid crystalline compound forming domains in said polymeric binder agent.

13. The reversible recording medium as claimed in claim 12, wherein said reversible cholesteric reflection layer is prepared by polymerizing a mixture of said medium- or low-molecular weight cholesteric liquid crystalline compound, a prepolymer, and a polymerization initiator.

14. The reversible recording medium as claimed in claim 11, wherein said medium- or low-molecular weight cholesteric liquid crystalline compound comprises at least one compound selected from the group consisting of a cholesteric liquid crystalline compound of formula (I) and a cholesteric liquid crystalline compound of formula (II):

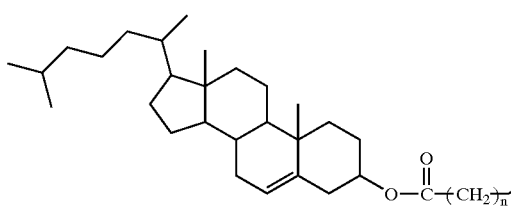

(I)

wherein n is an integer of 5, 6, or 7, and R is H or $CH_3$;

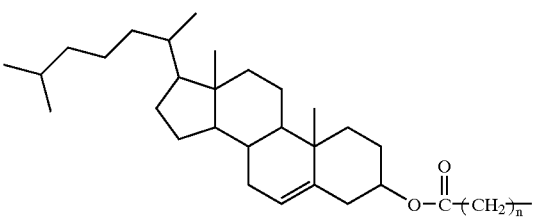

(II)

wherein n is an integer of 2 to 10.

15. The reversible recording medium as claimed in claim 14, wherein said cholesteric liquid crystalline compound of formula (II) comprises dicholesteryl-10,12-docosadiynedioate.

16. The reversible recording medium as claimed in claim 11, wherein said medium- or low-molecular weight liquid crystalline compound comprises a compound of formula (III):

$$Z'\text{-O--CO-}(CH_2)_n\text{-C}\equiv C\text{--C}\equiv C\text{-}(CH_2)_n\text{-CO--O--Y'}$$ (III)

wherein Z' and Y' are each independently a dihydrocholesteryl group, a hydrogen atom, or an alkyl group, provided that at least one of Z' or Y' represents a dihydrocholesteryl group; and m and n are each independently an integer of 1 or more.

17. The reversible recording medium as claimed in claim 1, wherein said support assumes a white color.

18. The reversible recording medium as claimed in claim 17, wherein a non-image portion of said reversible light absorbing layer is in a decolorized state, and a non-image portion of said reversible cholesteric reflection layer is in a transparent state.

19. The reversible recording medium as claimed in claim 1, wherein said support is transparent.

20. A method for reversibly recording an image in a reversible recording medium which comprises:
   a support,
   a reversible light absorbing layer formed on said support, and
   a reversible cholesteric reflection layer formed on said reversible light absorbing layer, comprising a cholesteric liquid crystalline compound capable of assuming a cholesteric liquid crystalline phase reversibly showing iridescent colors by selective reflection;
   wherein said reversible light absorbing layer is capable of causing a reversible thermosensitive coloring reaction, comprising the steps of:
      applying a thermal energy imagewise to said reversible recording medium to simultaneously form an image in said reversible cholesteric reflection layer and an image in said reversible light absorbing layer in a superimposed configuration, and
      recording said image formed in said reversible cholesteric reflection layer or said image formed in said reversible light absorbing layer by controlling the conditions of cooling and heating said recording medium.

21. The reversible recording method as claimed in claim 20, wherein said thermal energy is applied to the side of said reversible cholesteric reflection layer.

22. The reversible recording method as claimed in claim 20, wherein said reversible light absorbing layer comprises a coloring composition which comprises at least an electron-donor coloring compound and an electron acceptor compound, said composition being capable of reversibly assuming a color-developed state and a decolorized state depending upon heating and cooling conditions.

23. The reversible recording method as claimed in claim 22, wherein said color-developed state and said decolorized state of said coloring composition are reversibly changeable in such a manner that:

said coloring composition is in said decolorized state in the form a solid at room temperature, said decolorized state turns into said color-developed state by heating, with said color-developed state being maintained at room temperature by rapid cooling, and said color-developed state turns into said decolorized state by heating, with said decolorized state being maintained at room temperature by cooling.

24. The reversible recording method as claimed in claim 22, wherein said color-developed state of said reversible light absorbing layer produces a black color.

25. The reversible recording method as claimed in claim 24, wherein said recorded image displays a black color in said recording step, which recorded image is corresponding to said image formed in said reversible light absorbing layer.

26. The reversible recording method as claimed in claim 22, wherein said coloring composition for use in said reversible light absorbing layer has a color development initiating temperature $T_3$, and said liquid crystalline compound for use in said reversible cholesteric reflection layer has a crystallization temperature $T_5$, wherein $T_3 > T_5$.

27. The reversible recording method as claimed in claim 22, wherein said coloring composition for use in said reversible light absorbing layer has a color development initiating temperature $T_3$, and said liquid crystalline compound for use in said reversible cholesteric reflection layer has an isotropic phase transition temperature $T_6$, wherein $T_3 \geq T_6$.

28. The reversible recording method as claimed in claim 20, wherein said cholesteric liquid crystalline compound assumes an isotropic phase by heating, and said isotropic phase turns into a transparent amorphous phase by rapid cooling, with said transparent amorphous phase being maintained at room temperature.

29. The reversible recording method as claimed in claim 28, wherein said isotropic phase turns into said cholesteric liquid crystalline phase capable of showing said iridescent colors depending upon temperature by cooling, and said cholesteric liquid crystalline phase turns into a cholesteric glass phase by rapid cooling, with said iridescent colors being maintained at room temperature.

30. The reversible recording medium as claimed in claim 29, wherein said cholesteric glass phase turns into a crystalline phase by heating, with said crystalline phase being maintained at room temperature.

31. The reversible recording method as claimed in claim 20, wherein said cholesteric liquid crystalline compound comprises a polymeric cholesteric liquid crystalline compound.

32. The reversible recording method as claimed in claim 20, wherein said cholesteric liquid crystalline compound comprises a medium- or low-molecular weight cholesteric liquid crystalline compound with a molecular weight of 2,000 or less and a glass transition temperature of 30° C. or more.

33. The reversible recording method as claimed in claim 32, wherein said reversible cholesteric reflection layer further comprises a polymeric binder agent, with said medium- or low-molecular weight cholesteric liquid crystalline compound forming domains in said polymeric binder agent.

34. The reversible recording medium as claimed in claim 33, wherein said reversible cholesteric reflection layer is prepared by polymerizing a mixture of said medium- or low-molecular weight cholesteric liquid crystalline compound, a prepolymer, and a polymerization initiator.

35. The reversible recording method as claimed in claim 32, wherein said medium- or low-molecular weight cholesteric liquid crystalline compound comprises at least one compound selected from the group consisting of a cholesteric liquid crystalline compound of formula (I) and a cholesteric liquid crystalline compound of formula (II):

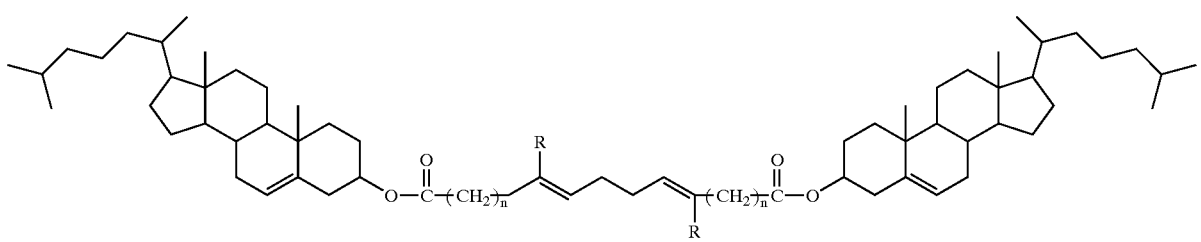

(I)

wherein n is an integer of 5, 6, or 7, and R is H or $CH_3$;

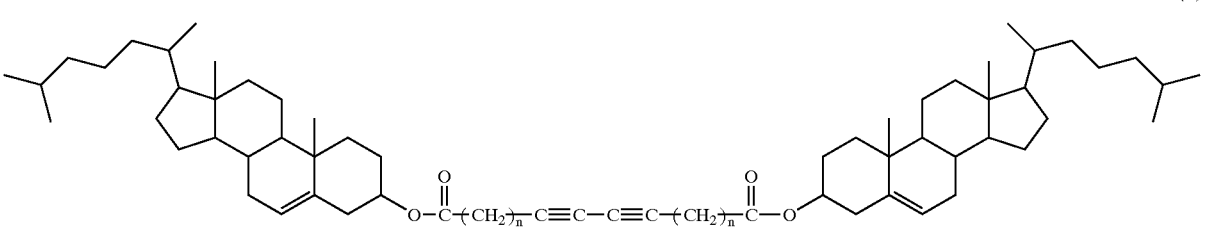

(II)

wherein n is an integer of 2 to 10.

36. The reversible recording medium as claimed in claim 35, wherein said cholesteric liquid crystalline compound of formula (II) comprises dicholesteryl-10,12-docosadiynedioate.

37. The reversible recording method as claimed in claim 32, wherein said medium- or low-molecular weight liquid crystalline compound comprises a compound of formula (III):

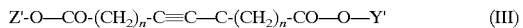
$$Z'-O-CO-(CH_2)_n-C\equiv C-C-(CH_2)_n-CO-O-Y' \quad (III)$$

wherein Z' and Y' are each independently a dihydrocholesteryl group, a hydrogen atom, or an alkyl group, provided that at least one of Z' or Y' represents a dihydrocholesteryl group; and m and n are each independently an integer of 1 or more.

38. The reversible recording method as claimed in claim 20, wherein said support of said reversible recording medium is transparent.

39. The reversible recording method as claimed in claim 38, wherein a non-image portion of said reversible light absorbing layer is in a decolorized state, and a non-image portion of said reversible cholesteric reflection layer is in a transparent state.

40. The reversible recording method as claimed in claim 20, wherein said support of said reversible recording medium is transparent.

41. The reversible recording method as claimed in claim 20, wherein said image formed in said reversible light absorbing layer is made smaller than said image formed in said reversible cholesteric reflection layer.

42. The reversible recording method as claimed in claim 20, wherein said recorded image displays multi-colors in said recording step, which recorded image is corresponding to said image formed in said reversible cholesteric reflection layer.

43. A reversible recording apparatus comprising a reversible recording medium which comprises:
  a support,
  a reversible light absorbing layer formed on said support, a reversible cholesteric reflection layer formed on said reversible light absorbing layer, comprising a cholesteric light crystalline compound capable of assuming a cholesteric liquid crystalline phase reversibly showing iridescent colors by selective reflection;
  wherein said reversible light absorbing layer is capable of causing a reversible thermosensitive coloring reaction, and
  means for imagewise applying a thermal energy to said reversible recording medium to simultaneously form an image in said reversible cholesteric reflection layer and an image in said reversible light absorbing layer in a superimposed configuration, and
  means for recording said image formed in said reversible cholesteric reflection layer or said image formed in said reversible light absorbing layer by controlling the conditions of cooling and heating said recording medium.

44. The reversible recording apparatus as claimed in claim 43, wherein said thermal energy is applied to the side of said reversible cholesteric reflection layer.

45. A reversible recording apparatus as claimed in claim 43, wherein said reversible light absorbing layer comprises a coloring composition which comprises at least an electron-donor coloring compound and an electron acceptor compound, said composition being capable of reversibly assuming a color-developed state and a decolorized state depending upon heating and cooling conditions.

46. The reversible recording apparatus as claimed in claim 45, wherein said color-developed state and said decolorized state of said coloring composition are reversibly changeable in such a manner that:

said coloring composition is in said decolorized state in the form a solid at room temperature, said decolorized state turns into said color-developed state by heating, with said color-developed state being maintained at room temperature by rapid cooling, and said color-developed state turns into said decolorized state by heating, with said decolorized state being maintained at room temperature by cooling.

47. The reversible recording apparatus as claimed in claim 45, wherein said color-developed state of said reversible light absorbing layer produces a black color.

48. The reversible recording apparatus as claimed in claim 45, wherein said coloring composition for use in said reversible light absorbing layer has a color development initiating temperature $T_3$, and said liquid crystalline compound for use in said reversible cholesteric reflection layer has a crystallization temperature $T_5$, wherein $T_3 > T_5$.

49. The reversible recording apparatus as claimed in claim 45, wherein said coloring composition for use in said reversible light absorbing layer has a color development initiating temperature $T_3$, and said liquid crystalline compound for use in said reversible cholesteric reflection layer has an isotropic phase transition temperature $T_6$, wherein $T_3 \geq T_6$.

50. The reversible recording apparatus as claimed in claim 43, wherein said cholesteric liquid crystalline compound assumes an isotropic phase by heating, and said isotropic phase turns into a transparent amorphous phase by rapid cooling, with said transparent amorphous phase being maintained at room temperature.

51. The reversible recording apparatus as claimed in claim 50, wherein said isotropic phase turns into said cholesteric liquid crystalline phase capable of showing said iridescent colors depending upon temperature by cooling, and said cholesteric liquid crystalline phase turns into a cholesteric glass phase by rapid cooling, with said iridescent colors being maintained at room temperature.

52. The reversible recording apparatus as claimed in claim 51, wherein said cholesteric glass phase turns into a crystalline phase by heating, with said crystalline phase being maintained at room temperature.

53. The reversible recording apparatus as claimed in claim 43, wherein said cholesteric liquid crystalline compound comprises a polymeric cholesteric liquid crystalline compound.

54. The reversible recording apparatus as claimed in claim 43, wherein said cholesteric liquid crystalline compound comprises a medium- or low-molecular weight cholesteric liquid crystalline compound with a molecular weight of 2,000 or less and a glass transition temperature of 30° C. or more.

55. The reversible recording apparatus as claimed in claim 54, wherein said reversible cholesteric reflection layer further comprises a polymeric binder agent, with said medium- or low-molecular weight cholesteric liquid crystalline compound forming domains in said polymeric binder agent.

56. The reversible recording apparatus as claimed in claim 55, wherein said reversible cholesteric reflection layer is prepared by polymerizing a mixture of said medium- or low-molecular weight cholesteric liquid crystalline compound, a prepolymer, and a polymerization initiator.

57. The reversible recording apparatus as claimed in claim 54, wherein said medium- or low-molecular weight least one compound selected from the group consisting of a cholesteric liquid crystalline compound of formula (I) and a cholesteric liquid crystalline compound of formula (II):

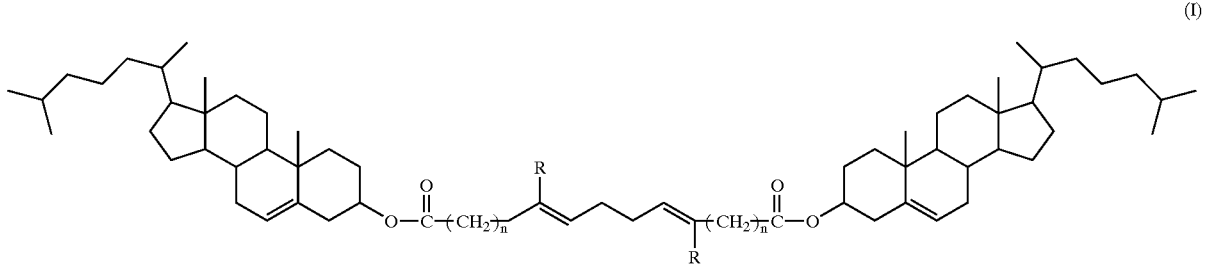

(I)

wherein n is an integer of 5, 6, or 7, and R is H or $CH_3$;

(II)

wherein n is an integer of 2 to 10.

58. The reversible recording apparatus as claimed in claim 57, wherein said cholesteric liquid crystalline compound of formula (II) comprises dicholesteryl-10,12-docosadiynedioate.

59. The reversible recording apparatus as claimed in claim 54, wherein said medium- or low-molecular weight liquid crystalline compound comprises a compound of formula (II):

$$Z'\text{-}O\text{-}CO\text{-}(CH_2)_m\text{-}C\equiv C\text{-}C\text{-}(CH_2)_n\text{-}CO\text{-}O\text{-}Y' \quad (III)$$

wherein Z' and Y' are each independently a dihydrocholesteryl group, a hydrogen atom, or an alkyl group, provided that at least one of Z' or Y' represents a dihydrocholesteryl group; and m and n are each independently an integer of 1 or more.

60. The reversible recording apparatus as claimed in claim 43, wherein said support of said reversible recording medium assumes a white color.

61. The reversible recording apparatus as claimed in claim 60, wherein a non-image portion of said reversible light absorbing layer is in a decolorized state, and a non-image portion of said reversible cholesteric reflection layer is in a transparent state.

62. The reversible recording apparatus as claimed in claim 43, wherein said support of said reversible recording medium is transparent.

63. The reversible recording apparatus as claimed in claim 43, further comprising means for making the size of said image formed in said reversible light absorbing layer smaller than the size of said image formed in said reversible cholesteric reflection layer.

* * * * *